US010216418B2

United States Patent
Choi et al.

(10) Patent No.: US 10,216,418 B2
(45) Date of Patent: Feb. 26, 2019

(54) STORAGE APPARATUS AND METHOD FOR AUTONOMOUS SPACE COMPACTION

(71) Applicants: Inseok Stephen Choi, Redwood City, CA (US); Yang Seok Ki, Palo Alto, CA (US); Sheng Qiu, San Jose, CA (US)

(72) Inventors: Inseok Stephen Choi, Redwood City, CA (US); Yang Seok Ki, Palo Alto, CA (US); Sheng Qiu, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 92 days.

(21) Appl. No.: 14/863,438

(22) Filed: Sep. 23, 2015

(65) Prior Publication Data

US 2016/0350007 A1  Dec. 1, 2016

Related U.S. Application Data

(60) Provisional application No. 62/169,551, filed on Jun. 1, 2015.

(51) Int. Cl.
*G06F 12/00* (2006.01)
*G06F 3/06* (2006.01)
*G06F 12/02* (2006.01)

(52) U.S. Cl.
CPC .......... *G06F 3/0608* (2013.01); *G06F 3/0638* (2013.01); *G06F 3/0683* (2013.01); *G06F 12/023* (2013.01); *G06F 2212/1044* (2013.01)

(58) Field of Classification Search
CPC .......... G06F 2212/401; G06F 12/0868; G06F 12/0866; G06F 3/0608; G06F 12/023; G06F 3/0638; G06F 2/0683; G06F 2212/1044
See application file for complete search history.

(56) References Cited

U.S. PATENT DOCUMENTS

| 8,140,740 | B2 | 3/2012 | Russo et al. |
| 8,479,080 | B1 | 7/2013 | Shalvi et al. |
| 8,819,335 | B1 | 8/2014 | Salessi et al. |
| 8,850,114 | B2 | 9/2014 | Rosenband et al. |

(Continued)

*Primary Examiner* — Arvind Talukdar
(74) *Attorney, Agent, or Firm* — Renaissance IP Law Group LLP

(57) ABSTRACT

Embodiments of the inventive concept improve performance, energy efficiency, and capacity of storage solutions, for example, by reducing the data movement between the CPU and the storage device and increasing the available capacity of the underlying storage devices via in-storage support for data compaction. Embodiments include a storage apparatus and method for autonomous in-storage space compaction initiated by a host-side command and according to metadata specified by a host. A space compact engine can function as an independent module or logic section within a storage device, which can migrate data within the storage device, thereby freeing up capacity and making preexisting data more compact. The space compact engine can cause self compact operations, self compact and trim operations, move and compact operations, and/or merge and compact operations. The space compact engine can notify the host of the completion of the operations.

4 Claims, 8 Drawing Sheets

(56) References Cited

U.S. PATENT DOCUMENTS

| | | | |
|---|---|---|---|
| 8,904,137 B1* | 12/2014 | Zhang | G06F 17/30135 |
| | | | 711/165 |
| 9,298,707 B1* | 3/2016 | Zhang | G06F 17/30008 |
| 2012/0030408 A1* | 2/2012 | Flynn | G06F 12/0246 |
| | | | 711/102 |
| 2012/0110249 A1* | 5/2012 | Jeong | G06F 3/0616 |
| | | | 711/103 |
| 2013/0013639 A1* | 1/2013 | Lacapra | G06F 17/30206 |
| | | | 707/770 |
| 2013/0060993 A1 | 3/2013 | Park et al. | |
| 2013/0124932 A1 | 5/2013 | Schuh et al. | |
| 2013/0132650 A1 | 5/2013 | Choi et al. | |
| 2013/0191649 A1* | 7/2013 | Muff | G06F 21/6218 |
| | | | 713/190 |
| 2013/0198438 A1 | 8/2013 | Masuo et al. | |
| 2013/0226931 A1* | 8/2013 | Hazel | G06F 17/30094 |
| | | | 707/741 |
| 2014/0281146 A1* | 9/2014 | Horn | G06F 3/064 |
| | | | 711/103 |
| 2014/0297601 A1* | 10/2014 | Pruner | G06F 17/30303 |
| | | | 707/692 |

\* cited by examiner

STORAGE APPARATUS AND METHOD FOR AUTONOMOUS SPACE COMPACTION

RELATED APPLICATION DATA

This application claims the benefit of U.S. patent application Ser. No. 62/169,551, filed Jun. 1, 2015, which is hereby incorporated by reference.

BACKGROUND

The present inventive concepts relate to data storage, and more particularly, to a storage apparatus and method for autonomous space compaction of data.

It is expected that within the next few years, billions of sensors will be deployed around the world and connected to the Internet Of Things (IOT). The amount of data collected by such sensors will be stored at least temporarily, and in some cases, permanently. The IOT will therefore rely on vast storage databases and underlying storage devices. Storage space compaction is an important aspect of modern data storage. For example, NoSQL database systems periodically merge database files and/or tables to reduce search footprints and maximize free space. Log-structured file systems (e.g., append-only file systems) sometimes implement segment cleaning to improve contiguous space availability for sequential writes. Other conventional approaches include disk defragmentation processes, which clean up invalid space for better performance.

Conventional approaches commonly cause intensive read and/or write activity between host CPUs and storage devices for data compaction. For example, Sorted Strings Tables (SSTables) can be compacted in Apache Cassandra™, an open source distributed database management system, but the intensive communication activity between the host CPUs and storage devices can be a limiting factor for performance. By way of another example, Append Only File (AOF) file rewrites in Redis, an open source key-value cache and store, can be challenging to scale due to the communication overhead. Embodiments of the present inventive concept address these and other limitations in the prior art.

BRIEF SUMMARY

Embodiments of the inventive concept can include a storage device having a space compaction engine. The storage device can further include one or more data storage sections and a communication and routing logic section configured to receive and route a data compaction command including metadata from a host. The space compaction engine can be communicatively coupled to the communication and routing logic section and to the one or more data storage sections. The space compaction engine can be configured to receive, from the communication and routing logic section, the data compaction command including the metadata, and to compact preexisting stored data in the one or more data storage sections based at least on the metadata and the data compaction command received from the host.

Embodiments of the inventive concept can include a computer-implemented method for compacting space in a storage device. The method can include receiving, by a communication and routing logic section of the storage device, a data compaction command including metadata from a host. The method can include routing, by the communication and routing logic section, the data compaction command to a space compaction engine. The method can include receiving, by the space compaction engine, the data compaction command including the metadata. The method can include compacting, by the space compaction engine, preexisting stored data in one or more data storage sections of the storage device, based at least on the metadata and the data compaction command received from the host.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
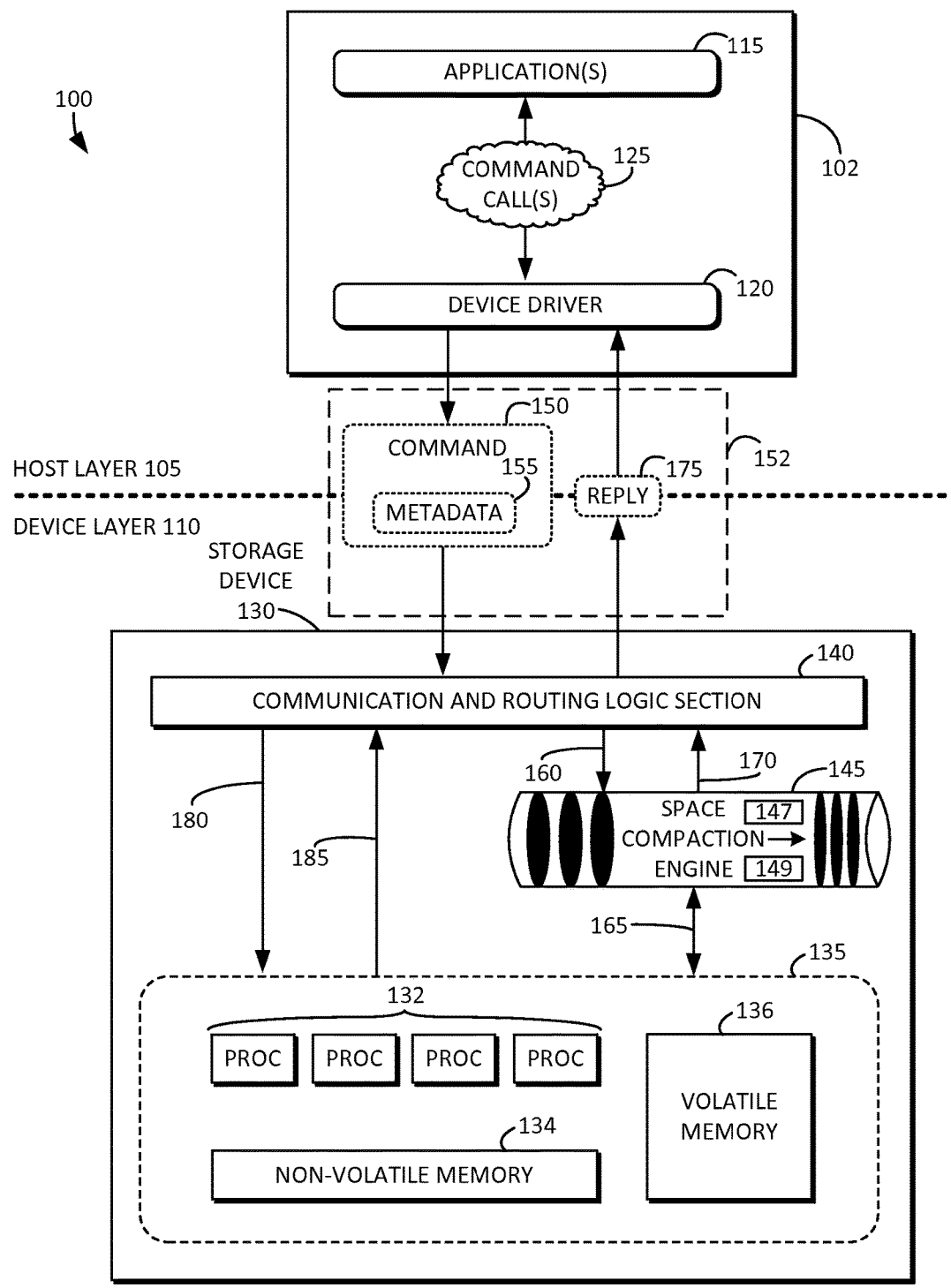
FIG. 1 is an example block diagram of an autonomous space compaction system including a host and a storage device having a space compaction engine for compacting data in accordance with embodiments of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first logic section could be termed a second logic section, and, similarly, a second logic section could be termed a first logic section, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the inventive concept improve performance, energy efficiency, and capacity of storage solutions, for example, by reducing the data movement between the CPU and the storage device and increasing the available capacity of the underlying storage devices via in-storage support for data compaction. Embodiments include a storage apparatus and method for autonomous in-storage space compaction initiated by a host-side command and according to metadata specified by a host.

A space compact engine can function as an independent module or logic section within a storage device, which can migrate data within the storage device, thereby freeing up capacity and making preexisting data more compact, as further described below. The space compact engine can cause self compact operations, self compact and trim operations, move and compact operations, and/or merge and compact operations, as also described in detail below. The space compact engine can notify the host of the completion of the operations. Memory bandwidth and host-CPU consuming work can be offloaded to an intelligent storage device to better utilize internal bandwidth and low power consumption of the storage device. In other words, such bandwidth and host-CPU consuming work can be replaced with a space compaction engine and process within the storage device, responsive to commands and metadata from the host.

FIG. 1 is an example block diagram of an autonomous space compaction system 100 including a host layer 105 and a device layer 110. The device layer 110 can include a storage device 130 having a space compaction engine 145 for compacting data in accordance with embodiments of the inventive concept. The space compaction engine 145 can include a space compaction logic section 147 and/or a space compaction storage section 149. In one embodiment, space compaction logic section 147 could comprise a central processing unit (CPU), a Field Programmable Gate Array (FPGA), an Application Specific Integrated Circuit (ASIC), etc., and space compaction storage section 149 could comprise Random Access Memory (RAM), Flash memory, Phase-Change Memory (PCM), etc. The storage device 130 can include any suitable type of non-volatile memories such as Flash, phase-change memory (PCM), spin transfer torque random access memory (STT-RAM), or the like. The storage device 130 can be, for example, a solid state drive (SSD) storage device. The host layer 105 can include a host 102, such as a host processor 102. The host processor 102 can be, for example, a central processing unit (CPU). It will be understood, however, that the host processor 102 can be any suitable kind of processor. It will also be understood that the host 102 can include a software process, a firmware section, a hardware unit, or any combination thereof.

The host 102 can include one or more applications 115 and a device driver 120. The one or more applications 115 can include, for example, a file system, a database, one or more processes, or the like. The one or more applications 115 can issue one or more command calls 125 to the device driver 120. For example, the one or more command calls 125 can include a data compaction command call 125. The data compaction command call 125 can be issued by way of an Ioctl, including a particular designated device, a command string, and metadata. For example, the Ioctl can be in the form of Ioctl(dev, "COMPACT", metadata, . . . ). It will be understood that the data compaction command call 125 can take other suitable forms or can be issued in other suitable ways without departing from the inventive concept disclosed herein. For example, the compaction command can be issued via a web-service interface, an application programming interface (API), or the like.

The host 102 can communicate with the storage device 130 via an interface 152. The interface 152 can include a serial advanced technology attachment (SATA) interface, a serial attached small computer system interface (serial attached SCSI or SAS), a non-volatile memory host controller interface specification express (NVMe) interface, an Ethernet interface such as a 10G/40G/100G Ethernet interface, a Fibre Channel (FC) interface, an Infiniband interface, a remote direct memory access (RDMA) interface, or the like. The device driver 120 of the host 102 can receive the data compaction command call 125. The device driver 120 can generate a command 150 including metadata 155, which can be transmitted to the storage device 130 from the host layer 105 to the device layer 110 via the interface 152.

In this manner, the storage device 130 can inherit the user and/or application-defined compaction parameters according to their own data structure determined on the host layer 105. The lower level flash translation layer (FTL) (not shown) or flash garbage collector (GC) (not shown) of the storage device 130 need not be aware of the user and/or application-defined compaction parameters, and vice-versa. Rather, the space compaction engine 145 can inherit the parameters from the host and autonomously implement the compaction within the storage device 130 based on such parameters. Consequently, the space compaction engine 145 also need not be aware of the FTL or the flash GC, but can sit at a level higher in the hardware and/or software stack. The command 150 and associated metadata 155 is described in detail below.

The storage device 130 can include a communication and routing logic section 140. The communication and routing logic section 140 can receive the command 150 and associated metadata 155 from the device driver 120 of the host 102. In response to the command 150 being associated with the data compaction command call (e.g., 125), the communication and routing logic section 140 can route the command 150 to the space compaction engine 145 via line 160.

The space compaction engine 145 can be communicatively coupled to the communication and routing logic section 140 via lines 160 and/or 170, and to a physical storage section 135 via line 165. The physical storage section 135 can include one or more data storage sections, for example, such as one or more non-volatile memory sections 134 and/or one or more volatile memory sections 136. The physical storage section 135 can include one or more processors 132. The one or more processors 132 can include one or more microprocessors and/or central processing units (CPUs). The space compaction engine 145 can receive, from the communication and routing logic section 140, the data compaction command 150 including the metadata 155. The space compaction logic section 147 can process the data compaction command 150 and/or the metadata 155. The space compaction storage section 149 can store the the data compaction command 150 and/or the metadata 155. The space compaction engine 145 can compact preexisting stored data in the physical storage section 135 based at least on the metadata 155 and the data compaction command 150 received from the host 102, as further described in detail below. The space compaction engine 145 can generate and transmit a reply 170 to the communication and routing logic section 140, which can send a reply 175 to the device driver 120 of the host. The reply 170 and/or 175 can indicate, for example, success or failure of the storage compaction request.

The communication and routing logic section 140 can route non-compaction related commands (e.g., any command not related to data compaction or the space compaction engine 145) via regular paths 180 and 185. In other words, all other commands that are not associated with space compaction can be routed by the communication and routing logic section 140 directly to the physical storage section 135, with replies being sent via line 185 back to the communication and routing section 140, and then returned as the reply 175 to the device driver 120 of the host 102.

Figure 2:
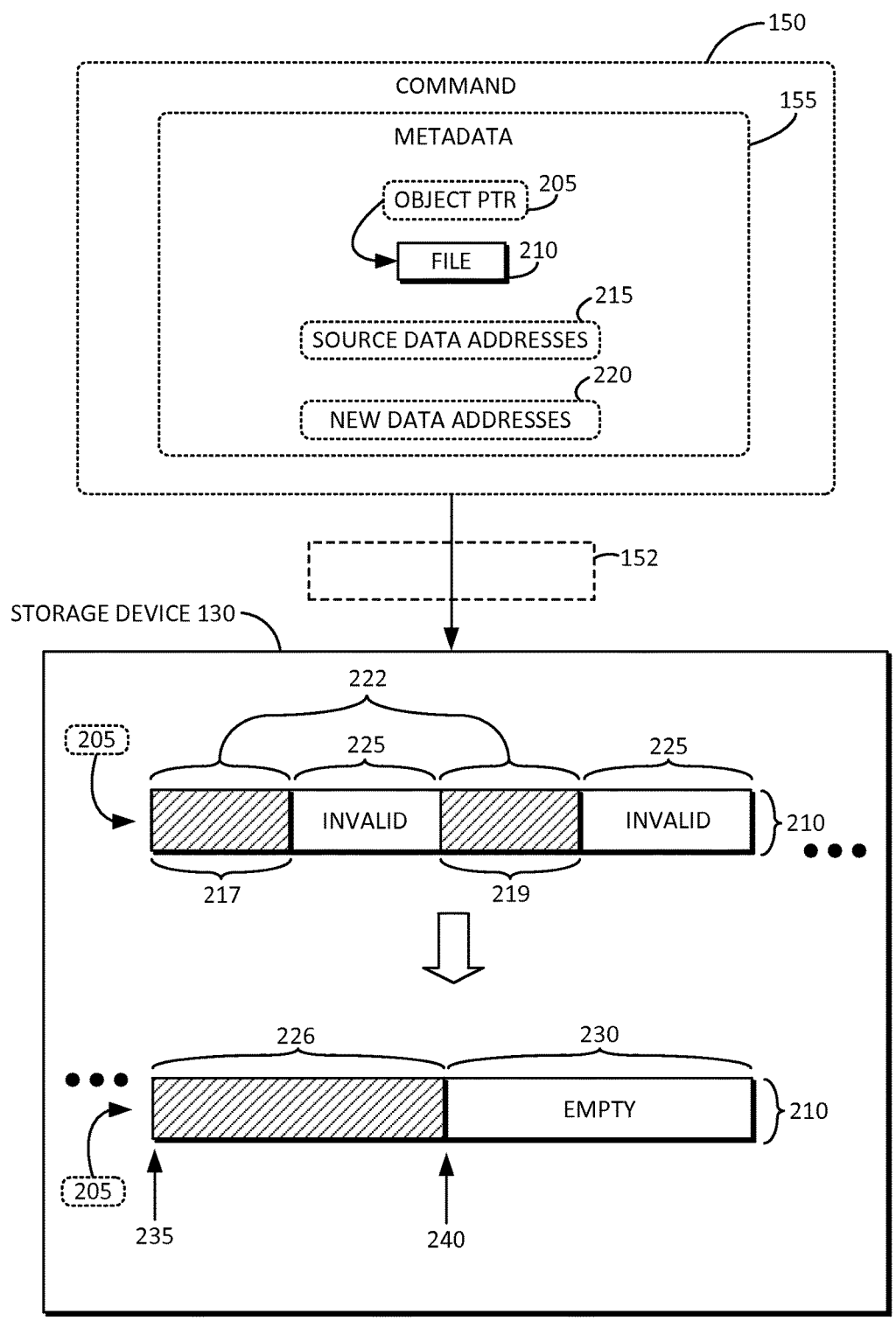
FIG. 2 is an example block diagram of a command including metadata associated with an object pointer, source data addresses, and new data addresses received by the storage device of FIG. 1.

FIG. 2 is an example block diagram of a command 150 including metadata 155 associated with an object pointer 205, source data addresses 215, and new data addresses 220 received by the storage device 130 of FIG. 1 via interface 152. The command 150 can be a data compaction command 150. The metadata 155 can include an object pointer 205, one or more source data addresses 215, and/or one or more new data addresses 220. The object pointer 205 can point to an object 210, which can be stored on the storage device 130, and can include preexisting stored data 222. The preexisting stored data 222 can exist in the object 210 stored in the storage device 130 prior to the command 150 being generated. Invalid data 225 can also exist in the object 210 stored in the storage device 130 prior to the command 150 being generated.

The space compaction engine 145 (of FIG. 1) can cause one or more subsets (e.g., 217) of the preexisting stored data 222 corresponding to the one or more source data addresses 215 to be migrated to a new location 226 within the object 210 corresponding to the one or more new data addresses 220. The space compaction engine 145 (of FIG. 1) can cause another one or more subsets (e.g., 219) of the preexisting stored data 222 corresponding to the one or more source data addresses 215 to be migrated to the new location 226 within the object 210 corresponding to the one or more new data addresses 220. The invalid data 225 can be discarded to free up space within the object 210, thereby providing additional empty space 230. The object pointer 205 can point to the same object 210 before and after such migration.

In some embodiments, the object 210 can be a file 210. For example, the object 210 can be a file 210 within a file system, a database, a key store, or the like. In the illustrated example, one or more source data addresses 215 can correspond to a first range of logical block addresses (LBAs) 217 within the file 210 and a second range of LBAs 219 within the file 210. The one or more new data addresses 220 can correspond to a third range 226 of LBAs within the file 210. For example, the first range 217 can correspond to LBAs 1-400, the second range 219 can correspond to LBAs 1000-1100, and the third range 226 can correspond to LBAs 4000-4500. It will be understood that any suitable number of subsets of the preexisting stored data and associated LBA ranges can exist in the file 210. After the migration of data, some of the preexisting stored data can be located in a different portion of the file 210 while other of the preexisting stored data can be located in a same portion of the file 210.

After the migration of data, an empty portion 230 can exist toward the end or tail of the file 210 due at least in part to the invalid data 225 being discarded. A log tail 235 before the migration can be adjusted to a new location 240 after the migration. Accordingly, the compaction can reorganize the file 210 so that the valid data 222 is logically contiguously organized, and the free or empty space can be logically contiguously organized, based at least on the command 150 and the metadata 155 received from the host 102 (of FIG. 1). The storage device 130 can handle the data migration task internally and reply to the host 102 (of FIG. 1) when it is done.

Figure 3:
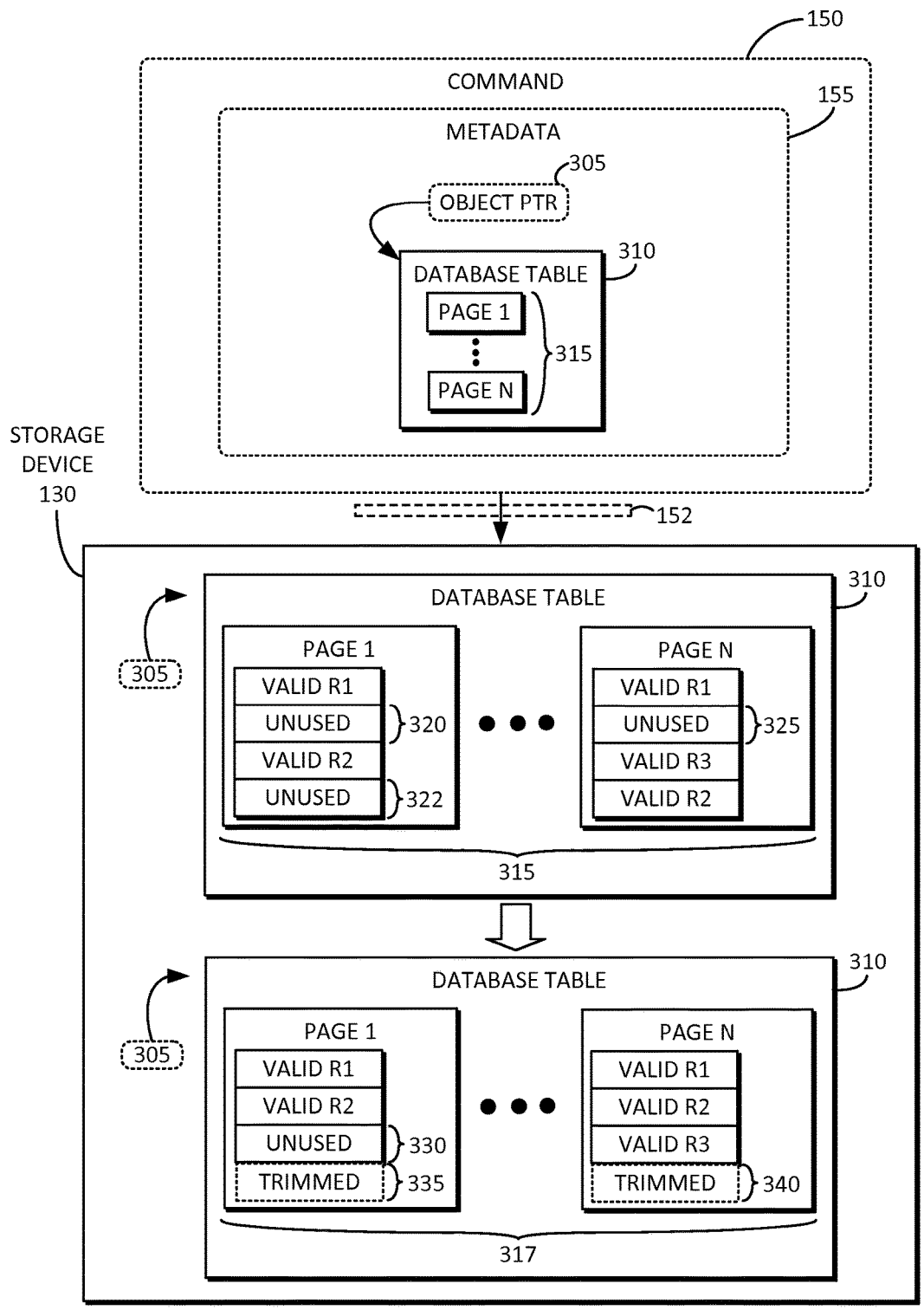
FIG. 3 is an example block diagram of a command including metadata associated with an object pointer received by the storage device of FIG. 1.

FIG. 3 is an example block diagram of a command 150 including metadata 155 associated with an object pointer 305 received by the storage device 130 of FIG. 1 via interface 152. The command 150 can be a data compaction command 150. The metadata 155 can include an object pointer 305. The object pointer 305 can point to an object 310, which can be stored on the storage device 130, and can include preexisting stored data 315. The preexisting stored data 315 can exist in the object 310 stored in the storage device 130 prior to the command 150 being generated. The space compaction engine 145 (of FIG. 1) can cause one or more subsets of the preexisting stored data 315 to be migrated to a new location within the object 310, as further described below.

The object 310 can be a database table 310 including one or more pages (e.g., page 1 through N). Each of the one or more pages can include one or more valid records (e.g., valid R1, valid R2, etc.) and/or one or more unused and/or invalid entries (e.g., 320, 322, and/or 325). The space compaction engine 145 (of FIG. 1) can cause the one or more valid records (e.g., valid R1, valid R2, etc.) of each of the one or more pages (e.g., page 1 through N) to be rearranged into a logically contiguous arrangement within each of the corresponding pages (e.g., page 1 through N).

For example, as shown in page 1 of the preexisting data 315 of the database table 310, valid record R1 is followed by unused and/or invalid space 320, which is followed by valid record R2, which is followed by unused space 322. After the space compaction engine 145 (of FIG. 1) rearranges the data into rearranged data 317, the page 1 can be arranged differently than before. Specifically, the page 1 can include valid record R1, followed by valid record R2, followed by unused space 330. Some or all of the unused space can be trimmed and released, as shown at 335, to free up more space within the page 1.

By way of another example, as shown in page N of the preexisting data 315 of the database table 310, valid record R1 is followed by unused space 325, which is followed by valid record R3, which is followed by valid record R2. After the space compaction engine 145 (of FIG. 1) rearranges the data into rearranged data 317, the page N can be arranged differently than before. Specifically, the page N can include valid record R1, followed by valid record R2, followed by valid record R3. Some or all of the unused space of page N can be trimmed and released, as shown at 340, to free up more space within the page N. Internal metadata such as page headers, directory structure, or the like, can be updated within the database table 310.

Accordingly, the space compaction engine 145 (of FIG. 1) can cause the one or more unused and/or invalid entries (e.g., 320, 322, and/or 325) of each of the one or more pages (e.g., page 1 through N) to be rearranged into a logically contiguous arrangement within each of the corresponding pages (e.g., page 1 through N). It will be understood that any suitable number of valid records can be rearranged into a logically contiguous arrangement within each page. The space compaction engine 145 (of FIG. 1) can cause the one or more unused and/or invalid entries (e.g., 320, 322, and/or 325) of each of the one or more pages (e.g., page 1 through N) to be trimmed or released from the database table 310. It will also be understood that any suitable unused space can be trimmed or released to free up additional space within each page. The compaction can improve the state of the database table 310 so that the valid records are logically contiguously organized, and the unused records trimmed or released to free up space in the database table 310, based at least on the command 150 and the metadata 155 received from the host 102 (of FIG. 1). The storage device 130 can handle the data compaction task internally and reply to the host 102 (of FIG. 1) when it is done.

Figure 4:
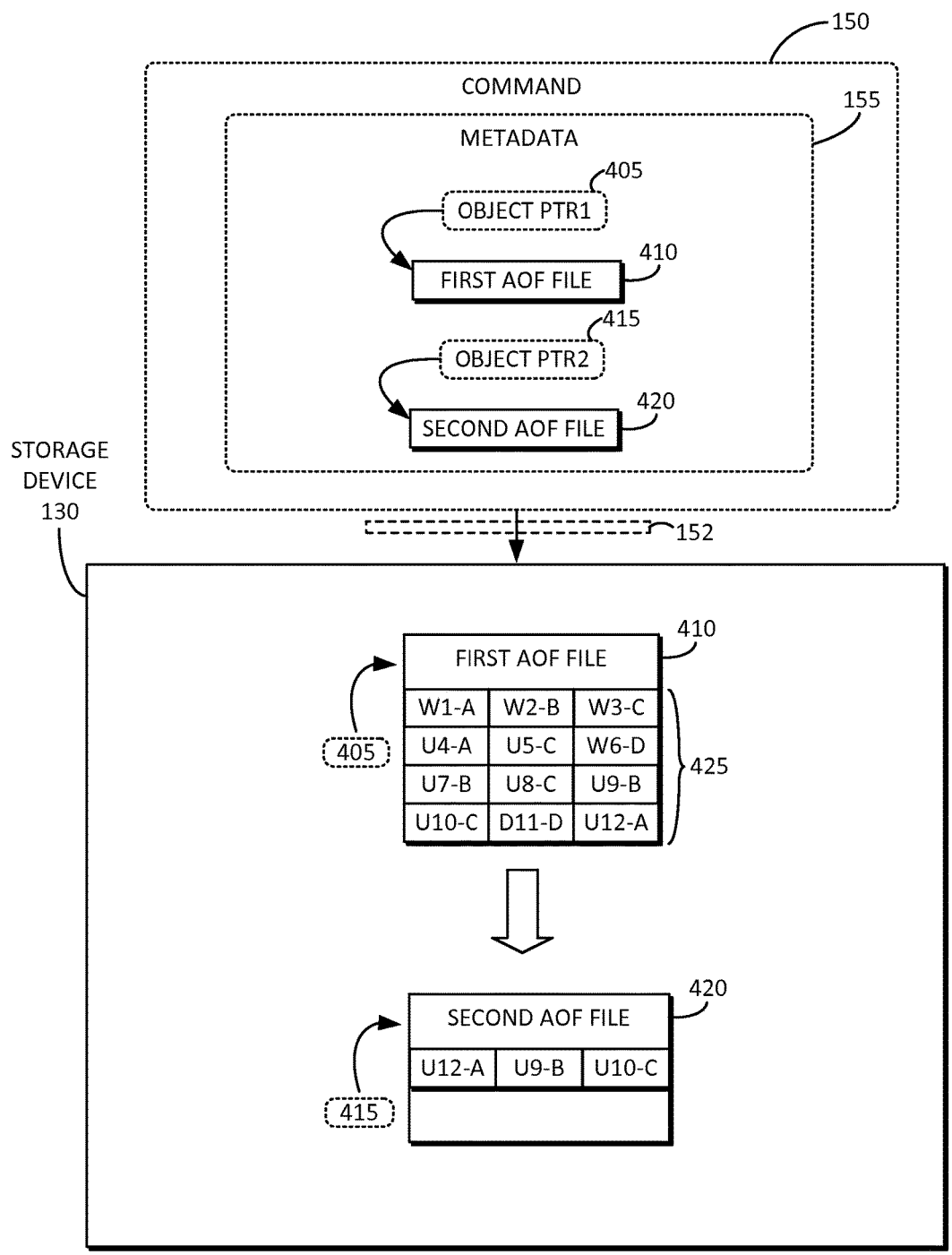
FIG. 4 is an example block diagram of a command including metadata associated with a first object pointer and a second object pointer received by the storage device of FIG. 1.

FIG. 4 is an example block diagram of a command 150 including metadata 155 associated with a first object pointer 405 and a second object pointer 415 received by the storage device 130 of FIG. 1 via interface 152. The command 150 can be a data compaction command 150. The metadata 155 can include the first object pointer 405, which can point to a first object such as AOF file 410. The metadata 155 can include the second object pointer 415, which can point to a second object such as AOF file 420. The first AOF file 410 and the second AOF file 420 can be stored on the storage device 130. The compaction in this embodiment can involve moving valid data from the first AOF file 410 to the second AOF file 420, thereby reorganizing the original object. The original AOF file 410 can then be deleted.

The first AOF file 410 can include preexisting stored data 425. The preexisting stored data 425 can exist in the first AOF file 410 stored in the storage device 130 prior to the command 150 being generated. The space compaction engine 145 (of FIG. 1) can cause one or more subsets (e.g., U12-A, U9-B, and/or U10-C) of the preexisting stored data 425 in the first object 410 to be migrated to the second object 420. The preexisting stored data 425 in the first AOF file 410 can include one or more timestamped records (e.g., W1-A, W2-B, W3-D, U4-A, U5-C, W6-D, U7-B, U8-C, U9-B, U10-C, D11-D, and U12-A), where 'W' represents a write operation, 'U' represents an update operation, 'D' represents a delete operation, and the digits 1 through 12 represent the timestamp of the records, which can be arranged in chronological order in the first AOF file 410. The letter 'A' represents a first unique key or type of data, the letter 'B' represents a second unique key or type of data, the letter 'C' represents a third unique key or type of data, and the letter 'D' represents a fourth unique key or type of data. For example, W1-A, U4-A, and U12-A can be associated with the same unique key or type of data. Thus, the various operations are interleaved within the AOF files. It will be understood that the first AOF file 410 can include any suitable number of records representing any suitable number of operations, and any suitable kind of timestamp associated with each record. It will also be understood that the first AOF file 410 can include any suitable number of unique keys or types of data.

The space compaction engine 145 (of FIG. 1) can cause a subset (e.g., W1-A, U4-A, and U12-A) of the one or more timestamped records 425 of the first AOF file 410 to be condensed into a single timestamped record (e.g., U12-A) and stored in the second AOF file 420. By way of another example, the space compaction engine 145 (of FIG. 1) can cause another subset (e.g., W2-B, U7-B, and U9-B) of the one or more timestamped records 425 of the first AOF file 410 to be condensed into a single timestamped record (e.g., U9-B) and stored in the second AOF file 420. By way of yet another example, the space compaction engine 145 (of FIG. 1) can cause still another subset (e.g., W3-C, U5-C, U8-C, and U10-C) of the one or more timestamped records 425 of the first AOF file 410 to be condensed into a single timestamped record (e.g., U10-C) and stored in the second AOF file 420. As for the unique key or type of data represented by the letter 'D,' since the last record for such key or type of data is a delete (e.g., D11-D), the records associated with such unique key or type of data represented by the letter 'D' can be discarded, and need not be copied or condensed over to the second AOF file 420.

Accordingly, in advanced key-value cache stores such as Redis, the compaction can compact the first AOF file 410 into the second AOF file 20, based at least on the command 150 and the metadata 155 received from the host 102 (of FIG. 1). In some embodiments, an AOF file can contain millions of records with associated millions of operations, which can be compacted down to far fewer records and associated operations, even down to an order of thousands instead of millions. The storage device 130 can handle the data compaction task internally and reply to the host 102 (of FIG. 1) when it is done.

Figure 5:
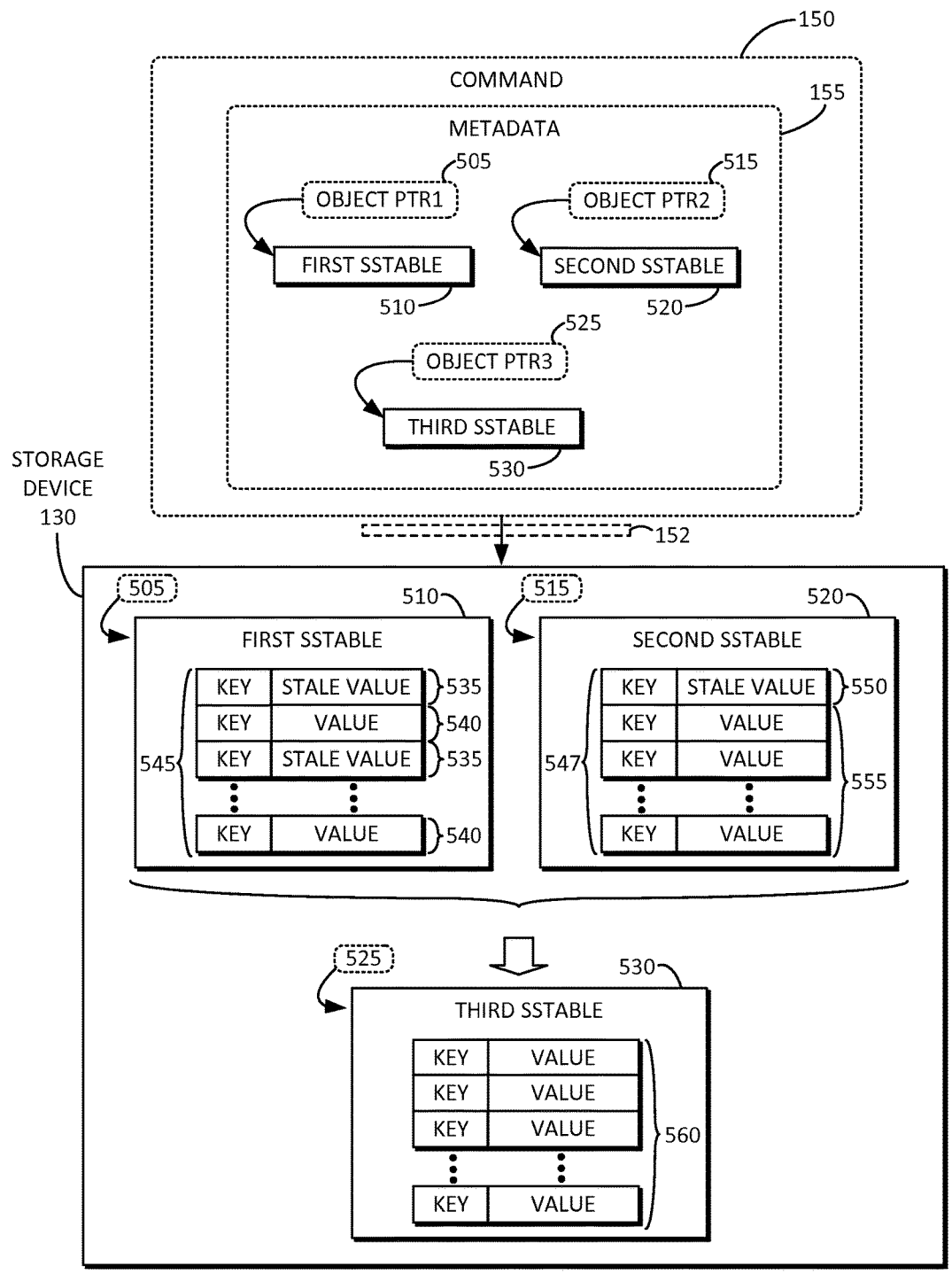
FIG. 5 is an example block diagram of a command including metadata associated with a first object pointer, a second object pointer, and a third object pointer received by the storage device of FIG. 1.

FIG. 5 is an example block diagram of a command including metadata associated with a first object pointer 505, a second object pointer 515, and a third object pointer 525 received by the storage device of FIG. 1. The command 150 can be a data compaction command 150. The metadata 155 can include the object pointer 505, the object pointer 515, and/or the object pointer 525. In some embodiments, the object pointers (e.g., 505, 515, and 525) can each be associated with a NoSQL database. The object pointers (e.g., 505, 515, and 525) can each point to a database table, such as an SSTable in Cassandra, Hbase, LevelDB, or any suitable kind of database table. Layout information associated with the SSTables can describe how key-value pairs are stored on the storage device 130.

The object pointer 505 can point to an object 510, which can be stored on the storage device 130, and can include a first portion (e.g., keys 545, values 540, and/or stale values 535) of preexisting stored data. The first portion (e.g., keys 545, values 540, and/or stale values 535) of preexisting stored data can exist in the object 510 stored in the storage device 130 prior to the command 150 being generated. The object pointer 515 can point to another object 520, which can be stored on the storage device 130, and can include a second portion (e.g., keys 547, values 555, and/or stale value 550) of preexisting stored data. The second portion (e.g., keys 547, values 555, and/or stale value 550) of preexisting stored data can exist in the object 520 stored in the storage device 130 prior to the command 150 being generated. The object pointer 525 can point to an object 530, which can be pre-allocated and/or stored on the storage device 130.

The space compaction engine 145 (of FIG. 1) can cause one or more subsets (e.g., values 540 and corresponding keys 545) of the first portion (e.g., keys 545, values 540, and/or stale values 535) of preexisting stored data to be migrated to the third object 530, as further described below. The space compaction engine 145 (of FIG. 1) can cause one or more subsets (e.g., values 555 and corresponding keys 547) of the second portion (e.g., keys 547, values 555, and/or stale value 550) of the preexisting stored data in the second object 520 to be migrated to the third object 530.

The first object 510 can correspond to a first Sorted Strings Table (SSTable) 510. The first portion of the preexisting stored data in the first SSTable 510 can include one or more keys 545, one or more values 540, and/or one or more stale values 535. The second object 520 can correspond to a second SSTable 520. The second portion of the preexisting stored data in the second SSTable 520 can include one or more values 555 and corresponding one or more keys 547. The second portion of the preexisting stored data in the second SSTable 520 can also include one or more stale values 550 and corresponding one or more keys 547. The third object 530 can correspond to a third SSTable 530, which can be pre-allocated on the storage device 130 for writing a new merged SSTable.

The space compaction engine 145 (of FIG. 1) can cause the one or more values 540 and corresponding one or more keys 545 of the first SSTable 510 to be migrated to the third SSTable 530. Similarly, the space compaction engine 145 (of FIG. 1) can cause the one or more values 555 and corresponding one or more keys 547 of the second SSTable 520 to be migrated to the third SSTable 530. In this manner, the compacted key-values can be written to the new SSTable 530 at 560. In other words, the compaction can merge multiple objects, remove tombstones in the input objects, and/or reorganize the input objects into one new output object. After the merge has completed, the SSTable 510 and the SSTable 520 can be deleted to free up space in the storage device 130.

The stale values (e.g., 535 and 550) need not be migrated. More specifically, the space compaction engine 145 (of FIG. 1) can cause the one or more stale values 535 and corresponding one or more keys 545 of the first SSTable 510 to not be migrated to the third SSTable 530. Similarly, the space compaction engine 145 (of FIG. 1) can cause the one or more stale values 550 and corresponding one or more keys 547 of the second SSTable 520 to not be migrated to the third SSTable 530.

Accordingly, the compaction can merge the first SSTable 510 and the second SSTable 520 into the third SSTable 530, based at least on the command 150 and the metadata 155 received from the host 102 (of FIG. 1). The storage device 130 can handle the data merge task internally and reply to the host 102 (of FIG. 1) when it is done. The reply (e.g., 175 of FIG. 1) can include a layout description of the newly written SSTable 530 after the compaction.

Figure 6:
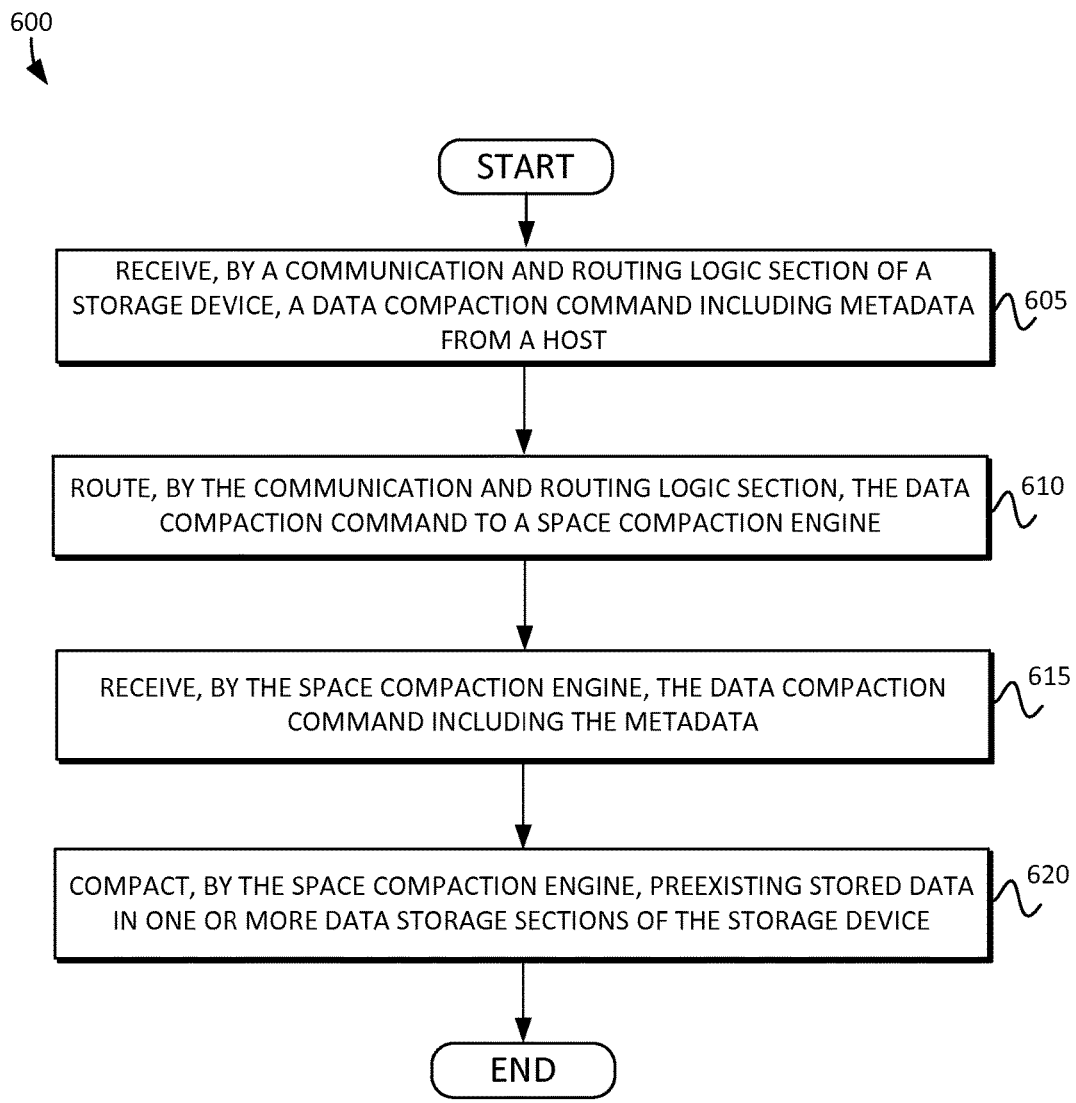
FIG. 6 is a flow diagram illustrating a technique for compacting preexisting stored data in one or more data storage sections of a storage device based on a host command in accordance with embodiments of the inventive concept.

FIG. 6 is a flow diagram 600 illustrating a technique for compacting preexisting stored data in one or more data storage sections (e.g., 134, 136) of a storage device (e.g., 130) based on a host command (e.g., 125, 150 of FIG. 1) in accordance with embodiments of the inventive concept. The technique can begin at 605, where a communication and routing logic section (e.g., 140 of FIG. 1) of a storage device (e.g., 130 of FIG. 1), can receive a data compaction command including metadata from a host (e.g., 102 of FIG. 1). At 610, the communication and routing logic section (e.g., 140 of FIG. 1) can route the data compaction command to a space compaction engine (e.g., 145 of FIG. 1). At 615, the space compaction engine (e.g., 145 of FIG. 1) can receive the data compaction command including the metadata. At 620, the space compaction engine (e.g., 145 of FIG. 1) can compact preexisting stored data in one or more data storage sections (e.g., 134, 136 of FIG. 1) of the storage device (e.g., 130 of FIG. 1). It will be understood that the steps shown in FIG. 6 need not be completed in the indicated order, but rather, can be performed in a different order and/or with intervening steps.

Figure 7:
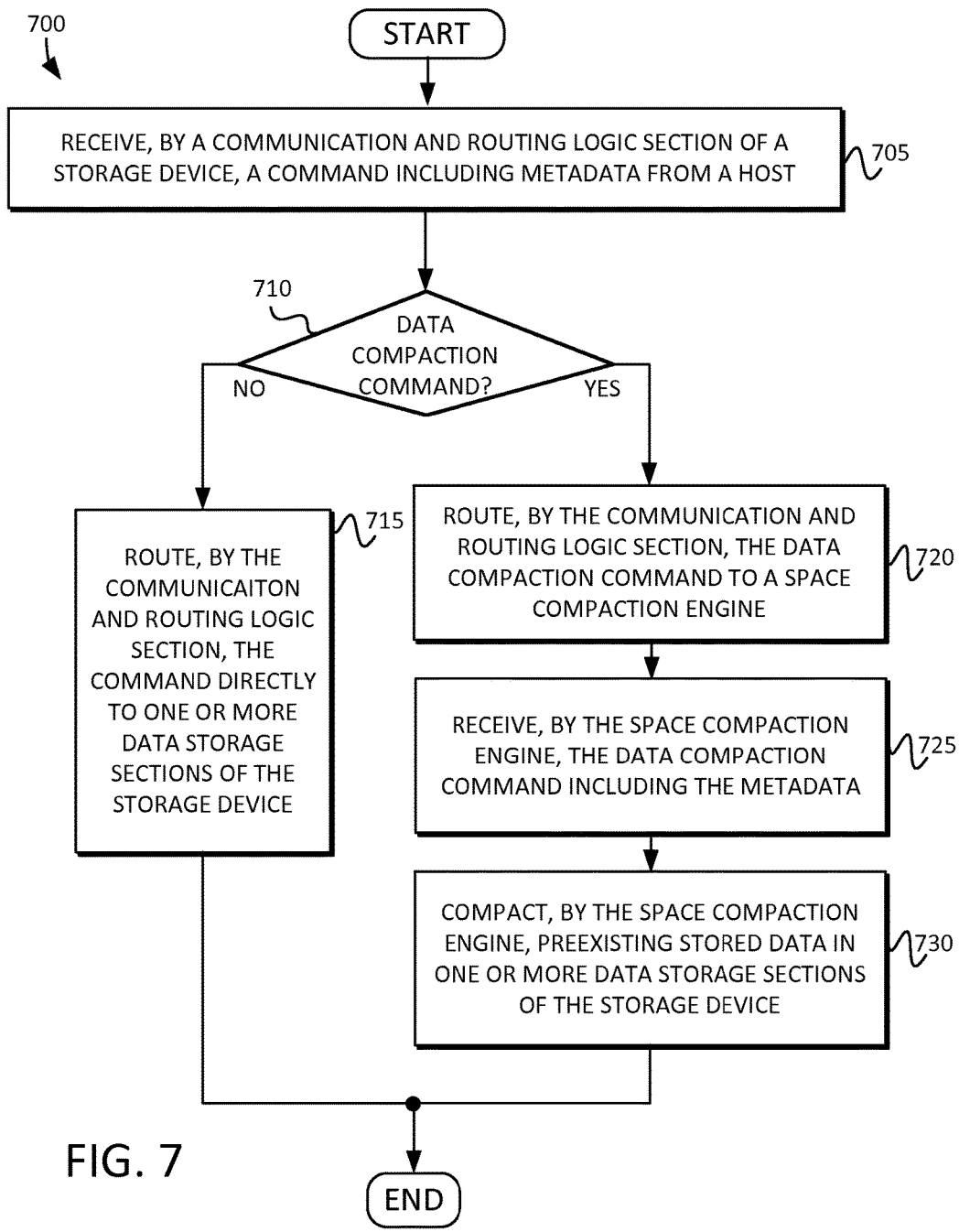
FIG. 7 is a flow diagram illustrating another technique for compacting preexisting stored data in one or more data storage sections of a storage device based on a host command in accordance with embodiments of the inventive concept.

FIG. 7 is a flow diagram 700 illustrating another technique for compacting preexisting stored data in one or more data storage sections (e.g., 134, 136 of FIG. 1) of a storage device (e.g., 130 of FIG. 1) based on a host command (e.g., 125, 150 of FIG. 1) in accordance with embodiments of the inventive concept. The technique can begin at 705, where a communication and routing logic section (e.g., 140 of FIG. 1) of a storage device (e.g., 130 of FIG. 1), can receive a command including metadata from a host (e.g., 102 of FIG. 1). At 710, a determination can be made whether the command is a data compaction command. If not, meaning that the command is a non-data compaction command, the flow can proceed to 715, where the communication and routing logic section (e.g., 140 of FIG. 1) can route the command directly to one or more data storage sections (e.g., 134, 136 of FIG. 1) of the storage device (e.g., 130 of FIG. 1) in the usual manner.

Otherwise, if so, meaning that the command is a data compaction command, the flow can proceed to 720. At 720, the communication and routing logic section (e.g., 140 of FIG. 1) can route the data compaction command to a space compaction engine (e.g., 145 of FIG. 1). At 725, the space compaction engine (e.g., 145 of FIG. 1) can receive the data compaction command including the metadata. At 730, the space compaction engine (e.g., 145 of FIG. 1) can compact preexisting stored data in one or more data storage sections (e.g., 134, 136 of FIG. 1) of the storage device (e.g., 130 of FIG. 1). It will be understood that the steps shown in FIG. 7 need not be completed in the indicated order, but rather, can be performed in a different order and/or with intervening steps.

Figure 8:
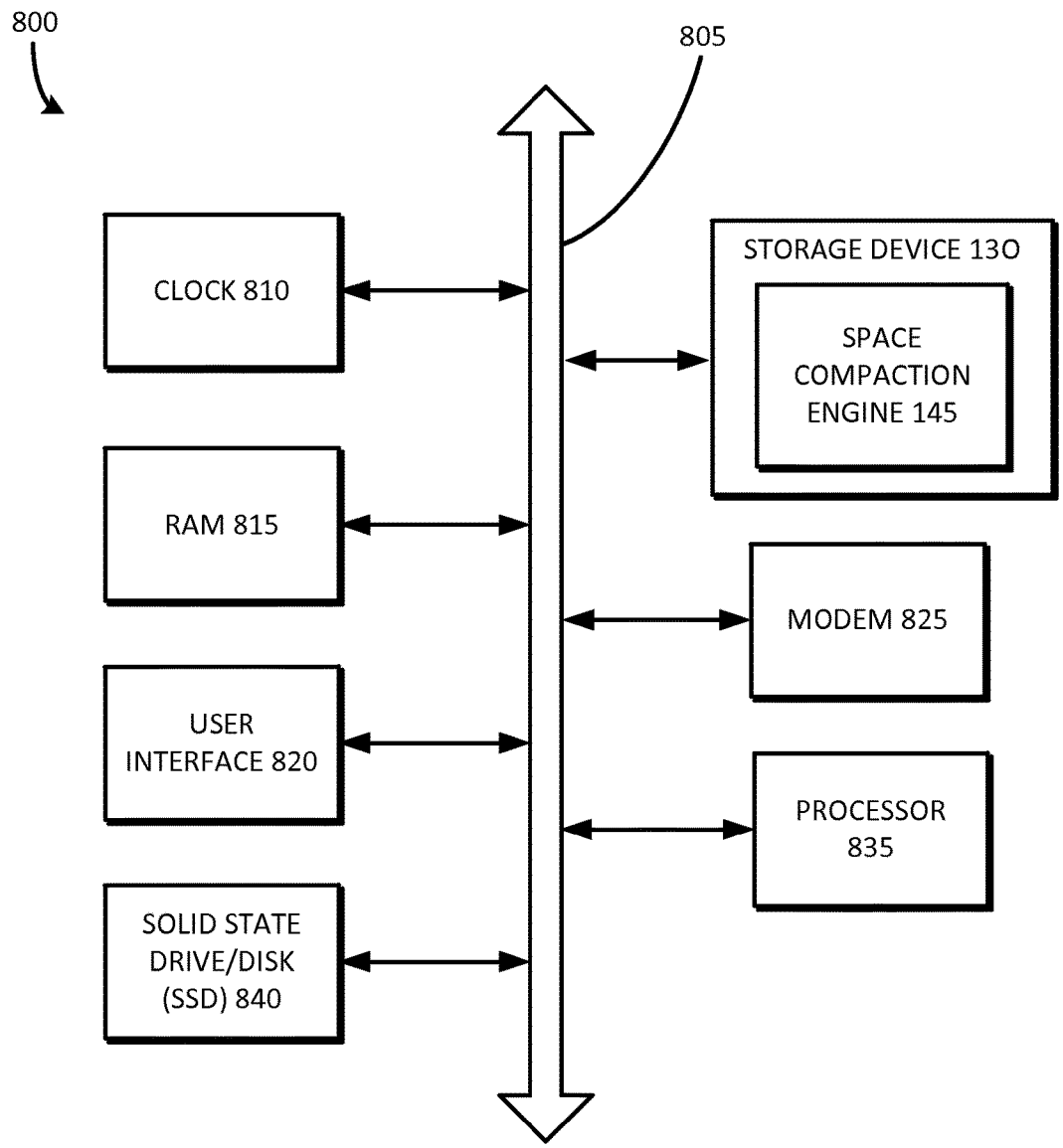
FIG. 8 is a block diagram of a computing system including the storage device having the space compaction engine of FIG. 1.

FIG. 8 is a block diagram of a computing system 800 including the storage device 130 having the space compaction engine 145 of FIG. 1. The computing system 800 can include a clock 810, a random access memory (RAM) 815, a user interface 820, a modem 825 such as a baseband chipset, a solid state drive/disk (SSD) 840, and/or a processor 835, any or all of which may be electrically coupled to a system bus 805. The computing system 800 can include the storage device 130 and space compaction engine 145 of FIG. 1, which may also be electrically coupled to the system bus 805. The space compaction engine 145 can include or otherwise interface with the clock 810, the random access memory (RAM) 815, the user interface 820, the modem 825, the solid state drive/disk (SSD) 840, and/or the processor 835.

The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A storage device, comprising:
one or more first processors;
one or more non-transitory storage sections storing a plurality of instructions, which when executed, cause the one or more first processors to cause a communication and routing logic section to receive and route a standalone data compaction command including first metadata from a host, and to receive and route a non-data compaction command including second metadata from the host, wherein the communication and routing logic section includes determining logic configured to distinguish the standalone data compaction command from the non-data compaction command; and
a space compaction engine including a second processor communicatively coupled to the communication and routing logic section and to one or more non-transitory data storage sections, wherein the second processor of the space compaction engine is configured to receive, from the communication and routing logic section, the standalone data compaction command including the first metadata, to process the standalone data compaction command including the first metadata, and to compact preexisting stored data in the one or more non-transitory data storage sections based at least on the first metadata and the standalone data compaction command received from the host,
wherein:
the communication and routing logic section is configured to route the standalone data compaction command to the space compaction engine, and to route the non-data compaction command to the one or more non-transitory storage sections, thereby bypassing the space compaction engine;
the first metadata includes an object pointer;
the object pointer points to an object including the preexisting stored data;
the space compaction engine is configured to cause one or more subsets of the preexisting stored data to be migrated to a new location within the object;
the object is a database table including one or more pages, each of the one or more pages including one or more logically discontiguous valid records and one or more logically discontiguous unused or invalid entries;
the space compaction engine is configured to cause the one or more logically discontiguous valid records of each of the one or more pages to be rearranged into a logically contiguous arrangement within each of the corresponding pages from among the one or more pages; and
the space compaction engine is configured to cause the one or more logically discontiguous unused or invalid entries of each of the one or more pages to be rearranged into a logically contiguous arrangement within each of the corresponding pages from among the one or more pages.

2. The storage device of claim 1, wherein the one or more data storage sections includes one or more non-volatile memory sections and one or more volatile memory sections.

3. The storage device of claim 1, wherein:
the first metadata further includes one or more source data addresses and one or more new data addresses; and
the space compaction engine is configured to cause one or more subsets of the preexisting stored data corresponding to the one or more source data addresses to be migrated to a new location within the object corresponding to the one or more new data addresses.

4. The storage device of claim 1, wherein:
the one or more unused or invalid entries pages include a plurality of unused or invalid entries rearranged into the logically contiguous arrangement; and
the space compaction engine is configured to cause the plurality of logically contiguous unused or invalid entries of each of the one or more pages to be trimmed from the database table.

* * * * *